Oct. 5, 1971  E. J. SAXL  3,610,036
PRECISION LOAD CELL
Filed Dec. 18, 1969  2 Sheets-Sheet 2
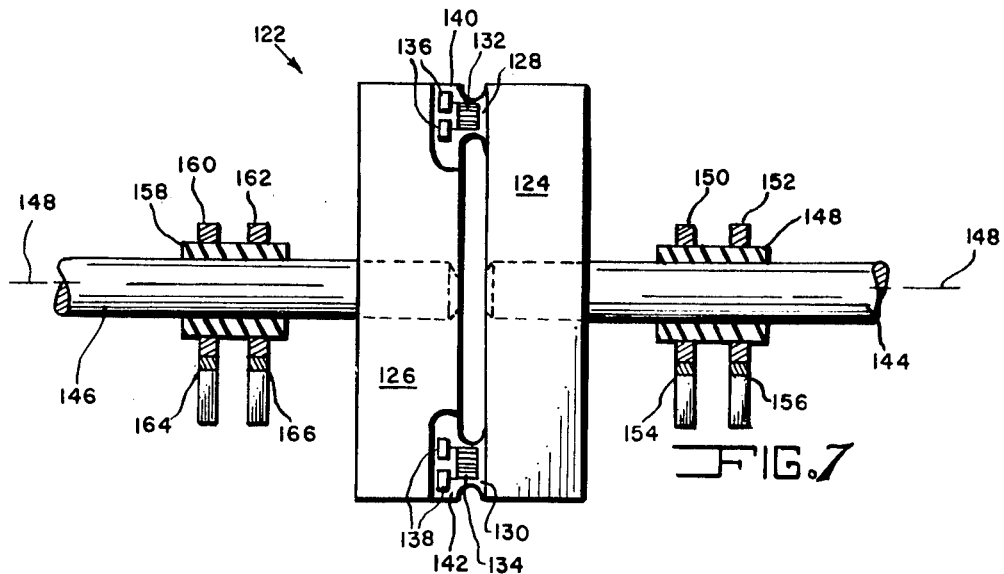
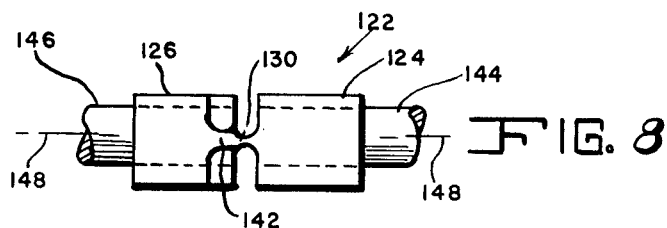
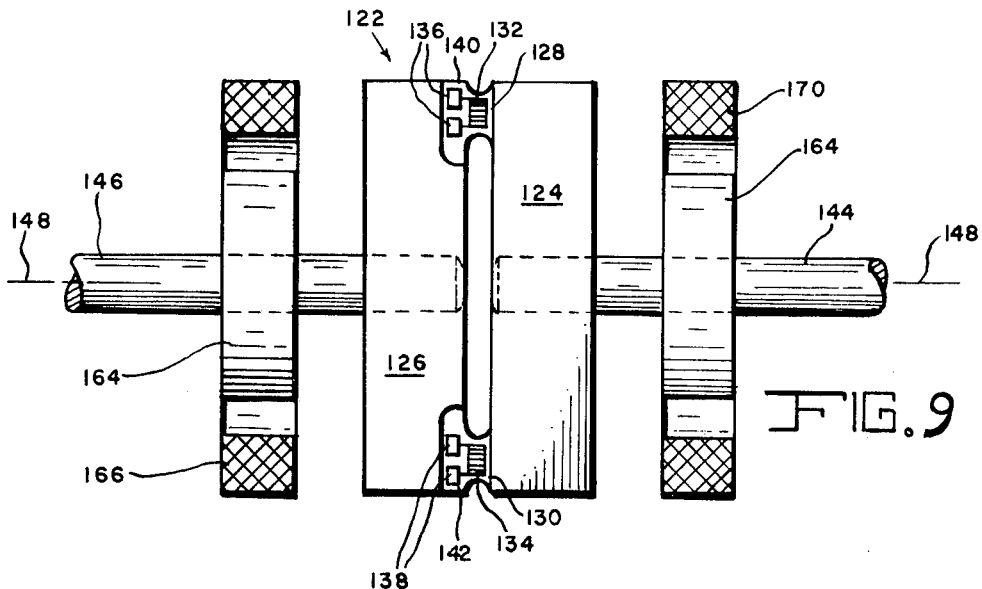
INVENTOR.
ERWIN J. SAXL
BY Walter J. Kreske
ATTORNEY

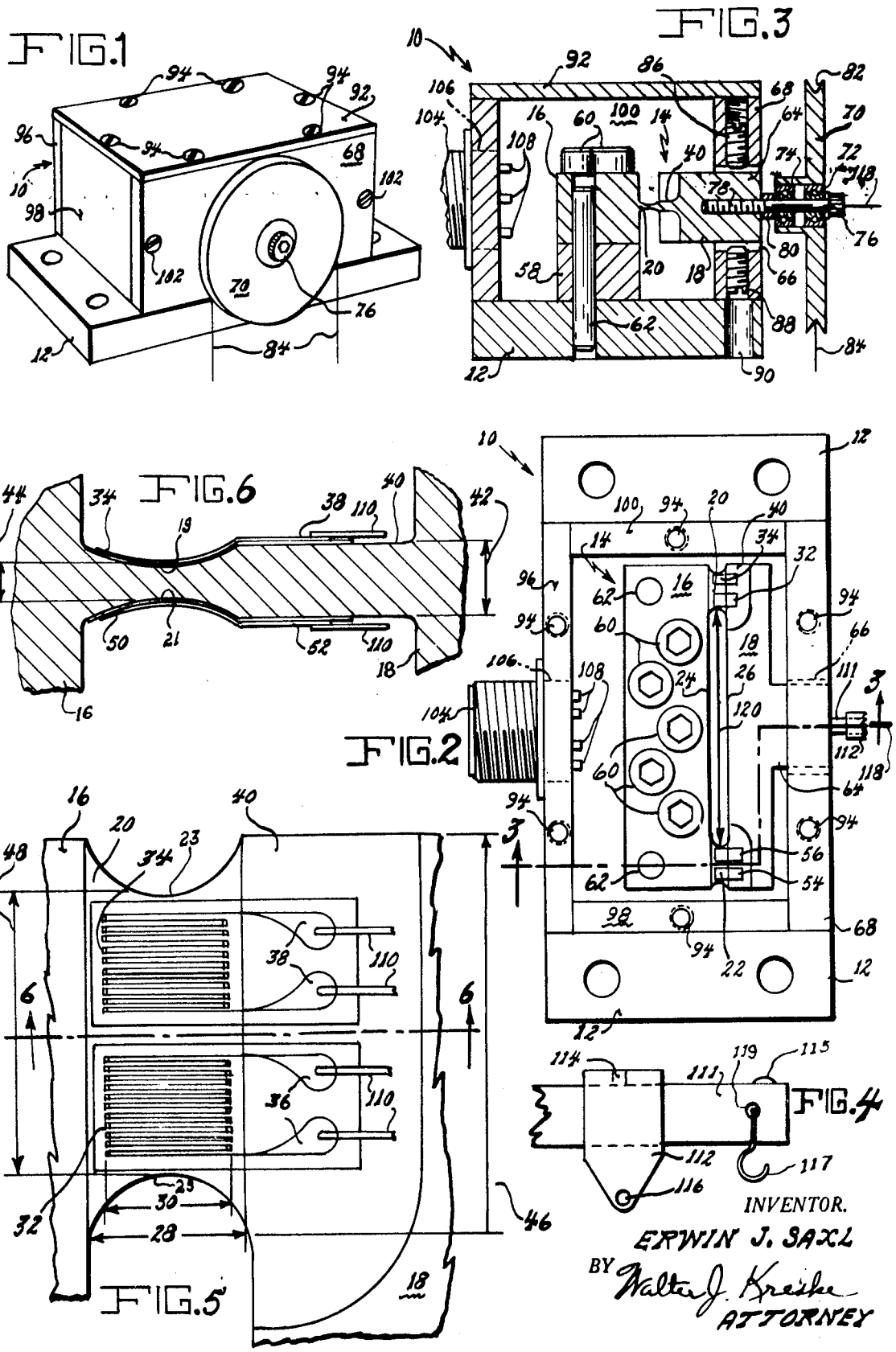

United States Patent Office 3,610,036
Patented Oct. 5, 1971

3,610,036
PRECISION LOAD CELL
Erwin J. Saxl, P.O. Box 185, Harvard, Mass. 01451
Filed Dec. 18, 1969, Ser. No. 886,129
Int. Cl. G01l 1/18
U.S. Cl. 73—141 A                          17 Claims

ABSTRACT OF THE DISCLOSURE

A load cell having two spaced apart, parallel, web-like, high gain stress concentration elements connecting a rigid body and rigid load sensing head, all formed of a single piece of homogeneous, high heat conductivity, high strength metal which thereby virtually prevents twist or side loading effects on strain gages at the web-like stress concentration elements and resulting in a highly linear and repetitively precise load measuring capability at even very low loads such as in the order of one fifth of a gram.

---

This invention relates to load cells and more particularly to load cells having capacity for repetitively precise load measurements even of very small loads, in the order of a fraction of a gram, by incorporating therein a pair of parallel, spaced apart, web-like, substantially identically dimensioned, high gain stress concentration elements connecting a rigid body portion and a rigid load sensing portion, all formed of a single piece of homogeneous metal of relatively high strength and elasticity. For example, a load inadvertently applied at even a slight angle to the direction of design sensitivity, or a residual stress from clamped load cell members, tends to cause erroneous readings due to resulting components of stress which are lateral to the direction of design sensitivity. Such undesirable susceptibility to lateral or side loading effects or slight twisting is particularly troublesome in the measurement of very small load forces such as a fraction of a gram to about three pounds, a range requiring extreme load cell sensitivity for meaningful measurements.

These problems have been overcome by the present invention which also incorporates other desirable features and advantages. Among these other desirable features and advantages of the present invention is the provision of a load cell which has capacity for making precise measurements over a wide range of force loads as well as very small force loads, in the order of one fifth of a gram, with a high degree of repetitive accuracy. Another desirable feature and advantage is that of an inherent high degree of linearity over the range of useful force measurements. Another feature and advantage of the present invention is that of its adaptability for selectively achieving desirable redundancy in its load measurement signals, or alternatively load signal averaging or doubling signal output for increased measurement sensitivity. Still further features and advantages include that of inherent freedom from need for temperature compensation, relative simplicity and compactness of structure, rapid response to changing dynamic load conditions, ready adaptability to measurement of tension in continuously moving filamentous material such as yarn or wire as well as measurement of static load forces.

A primary object of the present invention is the provision of a load cell which is virtually undeflectable in other than the direction of design sensitivity.

Another object is the provision of a load cell having capacity for force measurements with a high degree of repetitive accuracy for even very small load forces such as in the order of a fraction of a gram.

A further object is the provision of a load cell having a high degree of linearity over the operating range of force measurements.

And a still further object is the provision of a load cell having capacity for desirable redundancy in load measurements and alternatively signal averaging or signal adding for increased sensitivity at the election of the operator.

And another object is the provision of a load cell having inherent substantial freedom from need for temperature compensation or hysteresis correction of the web-like stress concentration elements and the strain gages attached thereto.

Further objects include a load cell structure which is relatively simple and compact, has a rapid response characteristic to changing dynamic load conditions, is readily adaptable to measurement of tension in continuously moving filaments such as yarn or wire, as well as the measurement of static load forces, and has a comparatively high resonant frequency.

These objects, features and advantages are achieved generally by the provision in the load cell of a pair of parallel, spaced apart, web-like, substantially identically dimensioned, high gain stress concentration elements or load columns connecting a rigid body portion and a rigid load sensing portion, all formed of a single piece of homogenous metal of relatively high strength and elasticity.

By selecting the metal of a type having a high thermal conductivity such as heat treated aluminum alloy or of beryllium copper, the need for temperature compensation is reduced, eliminated in some instances and simplified in others.

By spacing said parallel web-like stress concentration elements adequately apart from each other, unilateral deflection in only the direction of design sensitivity is assured with virtual freedom from lateral force component inaccuracies.

By making the stress concentration web-like elements in the order of size of the smallest precision bonded strain gage available, an economical structure with a high gain and capacity for very accurate repetitive measurement of even very small load forces such as a fraction of a gram is thereby achieved.

By providing a protective housing with the rigid body portion anchored in the housing and the rigid load sensing portion extending through an opening in a wall of the housing, and providing deflection limit stops to movement of the rigid load sensing portion in the direction of design sensitivity, a relatively simple, compact and rugged load cell structure is thereby achieved.

By fixing axially aligned torque transmitting shafts to the rigid body and load sensing portions at positions equidistant from the high gain stress concentration elements, and providing an electrical brush and slip ring arrangement or an induction transformer arrangement on each respective shaft for transmitting strain signals from the high gain stress concentration elements, accurate measurement of even very small torque forces is thereby achieved.

These and other objects, features and advantages will be better understood from the following description taken in connection with the accompanying drawings of a preferred embodiment of the invention and wherein:

FIG. 1 is an isometric view of a protective housing inclosing a load cell constructed and arranged in accordance with the present invention and incorporating a pulley for measuring tension in a filamentous material;

FIG. 2 is a plan view of the FIG. 1 embodiment with the cover plate removed and the pulley replaced by a lever arm arrangement for applying loads to be measured;

FIG. 3 is a cross sectional view taken on line 3—3 of

FIG. 2 but with the pulley of FIG. 1 incorporated therein;

FIG. 4 is a side elevation to enlarged scale of a portion of the lever arrangement shown partially in FIG. 2;

FIG. 5 is a plan view to greatly enlarged scale of one of the web-like stress concentration elements appearing in FIGS. 2 and 3 and carrying a pair of strain gages bonded thereto;

FIG. 6 is a cross sectional view taken on line 6—6 of FIG. 5 to more clearly show construction;

FIG. 7 is a plan view of a load cell according to the present invention adapted for measurement of torque loads;

FIG. 8 is a front elevation of the load cell in FIG. 7;

FIG. 9 is a plan view of a load cell in accordance with the present invention with an alternative adaptation for measurement of torque loads.

Referring to the drawings in more detail, a load cell in accordance with the present invention is housed in a protective housing designated generally by the numeral 10. The housing 10 has a base 12 which carries substantially centrally thereof a horizontally disposed load responsive member 14. The load responsive member 14 has a rigid rectangular solid body portion 16, parallel to which and in spaced relation is a rigid rectangular solid load sensing portion 18 and a pair of short, web-like stress concentration elements or load columns 20 and 22 connecting corresponding ends of the elongated body portion 16 and elongated load sensing portion 18. The body portion 16, load sensing portion 18 and connecting web-like stress concentration elements 20 and 22 are all formed from a single piece of homogenous, relatively high strength and high thermal conductivity elastic material such as heat treated aluminum alloy composition or beryllium copper. However for some purposes steel may also be used. The web-like stress concentration elements 20 and 22 are parallel to each other and perpendicular to opposed parallel faces 24 and 26 of the elongated body portion 16 and elongated load sensing portion 18 respectively and are of substantially identical dimensional configuration as shown to greatly enlarged scale in FIGS. 5 and 6 to respond in substantially identical manner to load deflection as will be hereinafter further described.

Referring to FIGS. 5 and 6 in more detail where web-like stress concentration element 20 is shown to greatly enlarged scale, the web-like stress concentration elements 20 and 22 have top and bottom notches such as 19 and 21 (FIG. 6) and side notches 23 and 25 (FIG. 5) for effecting maximum stress concentration from the above mentioned load deflection. The length 28 of the web-like stress concentration element is dimensioned to carry bonded thereto the strain measuring portion or wires 30 of the smallest precision bonded strain gages available in the strain gage art for the strain gages 32 and 34. Such short length of the web-like stress concentration elements 20 and 22 notched as shown thereby produces the very high stress concentration gain necessary for sensitivity to very small load changes such as in the order of a fraction of a gram, which is one of the important achievements of the present invention.

To avoid diluting the stress over the area occupied by the soldering tabs 36 and 38 of the strain gages 32 and 34 respectively, a support or land area 40 of thicker cross section 42 than the cross section thickness 44 of the web-like area carrying the strain gage measuring wires is provided for carrying the soldering tabs 36 and 38. It will also be noted that the width 46 of the support land 40 is substantially greater than the width 48 at the measuring wires of the strain gages 32 and 34 to further prevent dilution of the stress concentration at the strain gage measuring wires 30.

While, as shown in FIG. 5, two strain gages 32 and 34 are bonded on the web-like element 20 to satisfy those requirements where two completely independent sets of strain gages are used to balance one set with respect to the other, in some instances a single strain gage 34 bonded to the top surface and a single strain gage 50 bonded to the bottom surface of the web-like stress concentration element 20 and 22 may be used. In such an event the width 48 may be reduced to that of the single strain gage 34 to achieve further gain in the stress concentration element 20. By using only one strain gage at each side of the web-like element 20 at the point of high stress concentration, a heat-sink of maximum effectiveness is achieved since each web-like element includes at the top and bottom a respective area of tension and compression. Heating of the underlying structure for the four required strain gages is thus reduced to a minimum. This facilitates temperature compensation of the transducer. As explained above, a substantially identical dimensional and structural arrangement of strain gages will exist at the web-like stress concentration element 22. Also, the bottom surfaces will be similar to that shown in FIG. 6 with the bottom surface of the land 40 carrying the soldering tab 52 of the strain gage 50. Where dual sets of strain gages are used as explained above, each of the web-like stress concentration elements 20 and 22 will have two strain gages on the bottom surface and two strain gages on the top surface such as the strain gages 32, 34 and 54, 56 respectively. Where only a single set of strain gages is used, each of the web-like stress concentration elements 20 and 22 will have only one strain gage on each bottom surface and only one strain gage on each top surface such as 34 and 54 respectively.

The rigid body portion 16 is fastened to the base 12 on a spacer block 58 by cap screws 60 and dowel pins 62 (FIG. 2).

The elongated load sensing portion 18 has centrally thereof an extension 64 extending through an opening 66 in a front wall 68 of the protective housing 10 for carrying a suitable load force transmitting adapter. For example, in FIGS. 1 and 3 one such load force transmitting adapter is a pulley 70 mounted for substantially frictionless rotation on ball bearing sets 72 and 74 fastened to the end of extension 64 by a screw 76 with its threaded end in a threaded hole located in the extension 64 centrally of and in the same plane as the web-like stress concentration elements 20 and 22. A spacer washer 80 between the inner race of the ball bearing sets 74 and end of extension 64 provide suitable clearance for free rotation of the hub of the pulley 70 with respect to the end of the extension 64.

The pulley 70 preferably has a groove 82 for receiving a filamentous material such as yarn or wire 84 which may be in continuous movement about the pulley 70 and under tension which is transmitted through the pulley 70 and screw 76 to the load sensing portion 18. Deflection limiting set screws 86 and 88 above and beneath the load sensing extension 64 limits the amount of deflection of the extension 64 to a value selectable by adjusting the respective deflection limiting set screws. Clearance hole 90 in the base 12 and aligned with the setscrew 88 permits rapid access to the set screw 88 for selective deflection adjustment to accommodate desired load conditions and prevent injury to the instrument from possible overloading. No such rapid access hole is generally necessary for the set screw 86 since load deflection will always be downwards toward the set screw 88 except through inadvertence or mishandling of the load cell for which situation setscrew 86 may generally be permanently set to protect against excessive or injurious deflection upwards. However, if desired, a similar rapid access clearance hole may be provided in cover plate 92 which is fixed in place at the top of the protective housing 10 on parallel front and back walls 68 and 96, and side parallel walls 98 and 100, by screws 94. Similar screws through the housing base 12 (not shown) also fasten the walls 68, 96, 98 and 100 to the base 12. Also similar screws 102 may be used to fasten the front wall 68 and back wall 96 to the side walls 98 and 100.

A conventional multiterminal connector 104 is fixed in a hole 106 through the back wall 96 so that its terminals 108 may have soldered thereto lead wires 110 from the solder tabs of the strain gages such as 32, 34, 50, 54 and 56. The lead wires 110 may be coupled for adding signals from the respective strain gages, or averaging signals from the respective strain gages, or where duplicate strain gages are used as in FIGS. 2 and 5 for establishing two independent sources of similar added or averaged signals for checking each against the other. Such connections are conventional and well known in the art and do not form part of the present invention and therefore are not shown in the drawings.

To illustrate that other load applying adapters than pulley 70 may be used with the present invention, FIGS. 2 and 4 illustrate a lever arm type adapter 111 which may have a threaded end screwed into the hole 78 of the extension 64. The lever arm 111 may carry a slide or rider 112 adjustable along the beam 111 to which it may be fixed at any desired position by a set screw 114. A load carrying pin 116 in the slide 112 provides a convenient structure for hanging a selected load for measurement. While the pulley 70 and the beam 111 adapters are highly suitable for applying the above described loading force to load sensing extension 64, it should be understood that other types of adapters such as a hook 117 suspended from a hole 119 in the beam for hanging loads repetitively at a precise location along the beam 111, or a mushroom such as 115 against which pressure may be exerted, as well as special fixture configurations for applying special loading arrangements may also be used.

The beam 111 to which the adjustable rider 112 is mounted may be divided into increments so as to give a measurable change in mechanical advantage of the load application, adding mechanical sensitivity adjustment over and above the known gain-adjustments in the subsequent electronic modules (not shown) that are used in conjunction with the above load cell.

In the operation of the herein described load cell, the filament 84 about the pulley 70 when under tension will cause a corresponding deflection of the load sensing portion 18 toward the deflection limiting set screw 88. Such deflection will cause tension strain in the strain sensing wires of the strain gages located on the top surface of the web-like stress concentration elements 20 and 22 which in FIG. 2 are the strain gages 32, 34, 54 and 56. Such deflection will also cause compression strain in the bottom surface strain gages such as strain gage 50. Such tension and compression strains in the strain sensing wires correspondingly affect the electrical characteristics of the respective strain gages to thereby produce a corresponding signal in the output wires such as wires 110 which are coupled through terminals 108 and connector 104 to suitable conventional electric meters (not shown) for providing measurement of the actual tension force in the filament 84. Because of the high gain stress concentration configuration of the web-like elements 20 and 22, such measurement of the tension in the filament 84 is very precise, within a fraction of a gram. And such measurements may continuously or repetitively be made with this degree of precision. Such accuracy of measurement is similarly maintained for loads applied at load pin 116 on the beam adapter arrangement 111.

It will be noted that the direction of the load will be in a vertical direction perpendicular to a centerline 118 of the load sensing extension 64 and midway between the parallel web-like stress concentration elements 20 and 22 and in a plane carrying the centerline 118. Thus the load force will cause a unilateral deflection of the load sensing portion 18 with no twist or side loading effect at the web-like stress concentration elements 20 and 22. Because of the relatively large distance 120 between the web-like stress concentration elements as compared to the thickness 44 and width 48 of each web-like element there will be negligible side loading or twisting effect at the respective web-like elements 20 and 22 even if the load at the pulley 70 or the pin 116 is not precisely at right angles to the plane defined by the centerline 118 and web-like stress concentration elements 20 and 22. Such freedom from other than unilateral deflection at the web-like stress concentration elements 20 and 22 is another important reason for the achievement of such precision of measurement capability of the present invention.

TORQUE MEASURING EMBODIMENTS

Referring to FIG. 7 in more detail, therein is shown a load cell arrangement adapted for precision measurement of torque loads. The FIG. 7 embodiment includes a load responsive member designated generally by the numeral 122 which is similar to the load responsive member 14 shown in FIG. 3 in that it has an elongated rigid body portion 124 similar to the body portion 16 without the screw and dowel holes. The load responsive member 122 also has an elongated rigid load sensing portion 126 which may be similar to the load sensing portion 18 without the extension 64. The body portion 124 and the load sensing portion 126 are connected by short web-like stress concentration elements 128 and 130 similar to the web-like stress concentration elements 20 and 22 and carry on each of the top and bottom surfaces thereof at least one bonded precision strain gage such as the strain gages 132 and 134 respectively which may be similar to the strain gages 32 and 34 and having soldering tabs 136 and 138 respectively fixed to lands 140 and 142 of greater cross section and rigidity than the web-like stress concentration elements 128 and 130 and similar to the land 40.

A pair of torque transmitting shafts 144 and 146 having longitudinal axes coincident with the axis 148 of symmetry of the load responsive member 122 which falls in a position equidistant from the strain gages 132 and 134 and the web-like stress concentration elements 128 and 130. The torque transmitting shafts 144 and 146 are rigidly fixed at their inner ends to the rigid elongated body portion 124 and rigid elongated load sensing portion 126 respectively. The torque transmitting shaft 144 carries fixed thereto an insulator sleeve 148 to which is fixed a pair of electrically conductive slip rings 150 and 152 in electrical engagement with a pair of electrically conductive brushes 154 and 156 respectively. Similarly the torque transmitting shaft 146 has fixed thereto an insulator sleeve 158 carrying electrically conductive slip rings 160 and 162 engaging electrically conductive brushes 164 and 166 respectively. The electrically conductive brushes 154, 156, 164 and 166 are coupled to the soldering tabs 136 and 138 by electric current conductive cables (not shown) in well known manner for effecting current conduction and readout of electrical signals from the strain gages such as 132 and 134 in conventional manner.

In the operation of the FIG. 7 embodiment, a torque differential appearing between the torque transmitting shafts 144 and 146 will result in a stress concentration at the web-like stress concentration elements 128 and 130, the resulting strain of which appears as a signal from the strain gages such as 132 and 134 which may be read out on conventional meters (not shown) in conventional manner by suitable coupling to the above mentioned electrically conductive brushes 154, 156, 164 and 166.

In the FIG. 9 embodiment, numerals which are the same as those of FIG. 7 identify elements which may be the same as those in FIG. 7. The basic structural difference between the FIG. 7 and FIG. 9 embodiments is that of replacing the slip ring and brush arrangement on the FIG. 7 shaft 146 by an inductively wound armature 164 and an inductively wound stator 166 forming a rotary transformer. Likewise the slip ring and brush arrangement on the FIG. 7 shaft 144 is replaced in FIG. 9 by a similar inductively wound rotor 168 fixed to the FIG. 8 shaft 144 and an inductively wound stator 170 which together form a second rotary transformer. Electrical coupling between the rotary transformers and the soldering tabs such as 136 and 138 of the strain gages 132 and 134 and other rotary transformer elements (not shown) to form a conventional rotary transformer system is done in well known manner which is not part of the present invention and therefore not shown.

In the operation of the FIG. 9 embodiment, a torque differential on the torque transmitting shafts 144 and 146 will, as explained in connection with the FIG. 7 embodiment, result in a stress concentration at the web-like stress concentration elements 128 and 130 in FIG. 8, the resulting strain of which appears as a signal from the strain gages such as 132 and 134 in FIG. 8 which may be read out on conventional meters (not shown) by suitable coupling to the rotary transformers on the shafts 144 and 146 in FIG. 8.

It will be noted that the FIGS. 7 and 8 embodiments both achieve a structure permitting readout of strain signals on the strain gages whether the torque differential between shafts 144 and 146 occurs while the shafts are in rotation or are stationary.

This invention is not limited to the specific details of construction and operation herein described as equivalents will suggest themselves to those skilled in the art.

What is claimed is:

1. In a load cell for effecting highly precise load force measurements, the combination of a rigid base portion, a rigid load sensing portion having an axis for receiving said load force to be measured, said rigid base portion and rigid load sensing portion separated by an elongated opening therebetween in transvermse relation to said axis, a pair of substantially identically dimensioned relatively thin, short, parallel web-like stress concentration elements in spaced relation to each other in said opening, each of said relatively thin stress concentration elements being parallel to said axis and connecting said rigid base and rigid load sensing portions, one of said relatively thin web-like stress concentration elements being disposed a distance to one side of said axis and the other of said relatively thin web-like stress concentration elements being disposed an equal distance to the other side of said axis, the thin dimension of each of said relatively thin web-like stress concentration elements being in the same plane which plane is parallel to said axis, said base portion, load sensing portion and web-like stress concentration elements being of a single piece of homogenous metal, and means coupled to said rigid load sensing portion for applying said load force to said rigid load sensing portion through said axis at a position distal from an imaginary line through said thin dimension of said web-like stress concentration elements and in a direction perpendicular to said plane.

2. The combination as in claim 1 wherein said single piece of homogenous metal is a heat treated aluminum alloy.

3. The combination as in claim 1 wherein said single piece of homogenous metal is beryllium copper.

4. The combination as in claim 1 wherein the distance between said web-like stress concentration elements is much greater than said thin dimension of each of said elements.

5. The combination as in claim 1 wherein said web-like stress concentration elements have a length no greater than five thirty-seconds of an inch and a width no greater than nine sixty-fourths of an inch.

6. The combination as in claim 1 having at least one electrical precision strain gage bonded to the top surface of each of said web-like stress concentration elements and at least one electrical precision strain gage bonded to the bottom surface of each of said web-like stress concentration elements with only the strain measuring wires of each strain gage covering the web-like stress concentration element and each of said strain gages having a tab for electric cable connection fixed to an area of greater rigidity that that of the web-like element.

7. The combination as in claim 6 wherein each of said tabs is on the side of the corresponding web-like element adjacent said rigid load sensing portion.

8. The combination as in claim 6 wherein each of said web-like elements at the positions of the respective bonded strain gages is notched at the top and bottom surfaces and on each of its sides for effecting maximum stress concentration at said positions.

9. In a load cell for effecting highly precise load force measurements, the combination of a rigid base portion, a rigid load sensing portion having an axis for receiving said load force to be measured, a pair of substantially identically dimensioned relatively thin, short, parallel web-like stress concentration elements in spaced relation to each other, one of said relatively thin web-like concentration elements being disposed a distance to one side of said axis and the other of said relatively thin web-like stress concentration elements being disposed an equal distance to the other side of said axis, the thin dimension of each of said relatively thin web-like stress concentration elements being in the same plane which plane is parallel to said axis, said base portion, load sensing portion and web-like stress concentration elements being of a single piece of homogenous metal, a protective housing about said base portion, load sensing portion and web-like stress concentration elements, means rigidly anchoring said base portion to said housing, an opening in said housing with said load sensing portion extending through said opening, deflection limit means at said opening for limiting deflection of said load sensing portion to a selected maximum deflection, and adapter means on the end of said load sensing portion for applying to said load sensing means a load force to be measured.

10. The combination as in claim 9 wherein said adapter means includes a frictionless bearing mounted pulley for receiving filamentary material under tension load to be measured by said load cell.

11. The combination as in claim 9 wherein said housing has a top and bottom and four sides with one of said sides having said opening, and said base portion is rigidly anchored to said bottom with said base portion, web-like elements and load sensing portion being in parallel relation to said bottom, and means on said bottom for fixing said housing in selected operating position.

12. The combination as in claim 9 wherein said adapter means includes a beam and an adjustable rider for carrying a load to be measured.

13. The combination as in claim 9 wherein said adapter means includes a beam and a mushroom fixed thereto for receiving a pressure load to be measured.

14. The combination as in claim 9 wherein said adapter means includes a beam and a hook carried at a selected reference position on said beam for providing repetitive accuracy in mechanical load placement for load measurement.

15. In a load cell for effecting highly precise load force measurements, the combination of a rigid base portion, a rigid load sensing portion having an axis for receiving said load force to be measured, a pair of substantially identically dimensioned relatively thin, short, parallel web-like stress concentration elements in spaced relation to each other, one of said relatively thin web-like stress concentration elements being disposed a distance to one side of said axis and the other of said relatively thin web-like stress concentration elements being disposed an equal distance to the other side of said axis, the thin dimension of each of said relatively thin web-like stress concentration elements being in the same plane which plane is parallel to said axis, said base portion, load sensing portion and web-like stress concentration elements being of a single piece of homogenous metal, each of said relatively thin web-like stress concentration elements having a top and a bottom surface, at least one electrical precision strain gage having strain measuring wires bonded to the top surface of each of said web-like stress concentration elements and at least one electrical precision strain gage having strain measuring wires bonded to the bottom surface of each of said web-like stress concentration elements with only the strain measuring wires of each strain gage covering the web-like stress concentration element and each of said strain gages having a tab for electric cable connection fixed to an area of greater rigidity than that of the web-like element, a pair of torque transmitting shafts having longitudinal axes aligned with the axis of said rigid load sensing portion rigidly fixed to said rigid load sensing portion and rigid base portion respectively, and electrical coupling means on at least one of said shafts arranged for transmitting strain signals from said strain gages.

16. The combination as in claim 15 wherein said electrical coupling means includes a pair of electrical brush and slip rings carried on at least one of said shafts.

17. The combination as in claim 15 wherein said electrical coupling means includes at least one rotary transformer on said shaft.

References Cited

UNITED STATES PATENTS

| 3,099,156 | 7/1963 | Perry, Jr. | 73—141 (A) |
|---|---|---|---|
| 3,128,622 | 4/1964 | Lebow | 73—136 (C) |
| 3,191,434 | 6/1965 | Brunner et al. | 73—136 (A) |
| 3,272,006 | 9/1966 | Eckard | 73—141 (A) |
| 3,280,623 | 10/1966 | Saxl | 73—141 (A) |
| 3,315,203 | 4/1967 | Jacobson | 73—141 (A) (X) |
| 3,320,569 | 5/1967 | Jones | 73—141 (A) (X) |
| 3,398,581 | 8/1968 | De Lucia | 177—229 (X) |
| 3,427,875 | 2/1969 | Saxl | 73—141 (A) |
| 3,461,715 | 8/1969 | Stover | 73—141 (A) |
| 3,474,875 | 10/1969 | Laimins | 177—229 (X) |

CHARLES A. RUEHL, Primary Examiner

U.S. Cl. X.R.

73—136 A, 144